Oct. 22, 1963　　　　　　　W. NEEF　　　　　　　3,107,374
CLAMPING MEANS FOR RADIALLY EXTENDING CHASERS
Filed Dec. 11, 1959　　　　　　　　　　　　　　2 Sheets-Sheet 1

INVENTOR.
WALTER NEEF
BY
Owen & Owen
ATTORNEYS

United States Patent Office 3,107,374
Patented Oct. 22, 1963

3,107,374
CLAMPING MEANS FOR RADIALLY
EXTENDING CHASERS
Walter Neef, Jackson, Mich., assignor, by mesne assignments, to Toledo-Beaver Tools, Inc., a corporation of Ohio
Filed Dec. 11, 1959, Ser. No. 858,887
3 Claims. (Cl. 10—120)

This invention relates to an improved device for threading pipes and more particularly to an improved drop head threader.

A drop head threader, as the machine is known in the art, includes a threading die head having replaceable chasers for accommodating pipes of several diameters. The die head can be used to cut threads in a pipe held in a vise by turning the die with a ratchet wrench or handle, or the pipe can be turned and the die head held stationary by preventing movement of the connected ratchet wrench or handle.

The present invention provides improvements on a threading die head of the drop head type, such as that shown in United States Patent 2,600,776, which can be made more easily and less expensively with fewer close tolerances being required, thereby enabling more accurate threads to be cut.

It is, therefore, a principal object of the invention to provide a threading die head requiring fewer close tolerances and that can be manufactured at less expense than known devices capable of the same precision of operation.

Another object of the invention is to provide an improved drop head threading die head which is capable of cutting more accurate threads on a pipe.

Other objects and advantages of the invention will be apparent from the following detailed description of a preferred embodiment thereof, reference being made to the accompanying drawing, in which.

Figure 2:
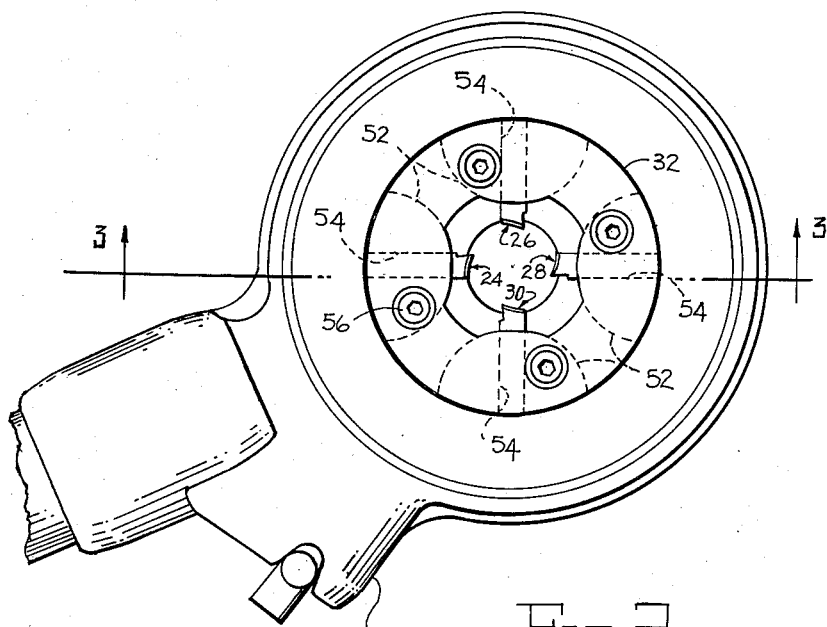
FIG. 2 is a front view of the die head shown in FIG. 1 and a portion of a ratchet wrench.
Figure 3:
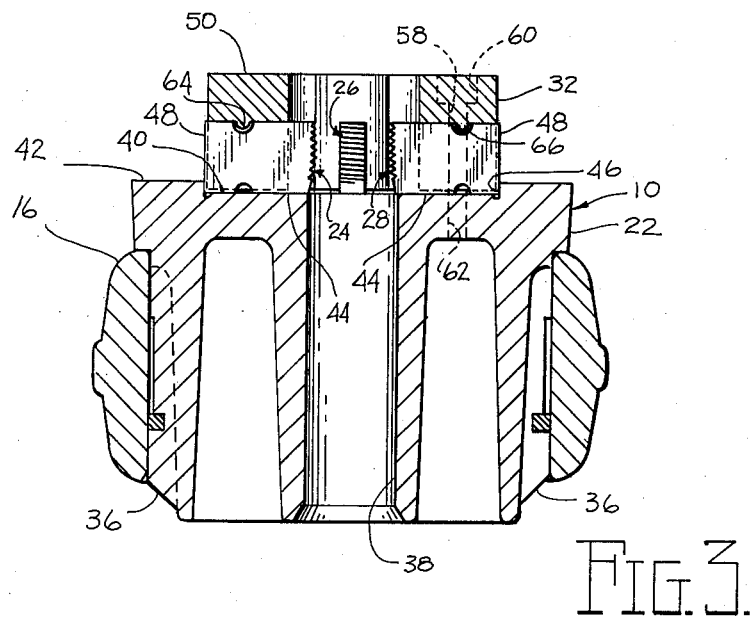
Figure 4:
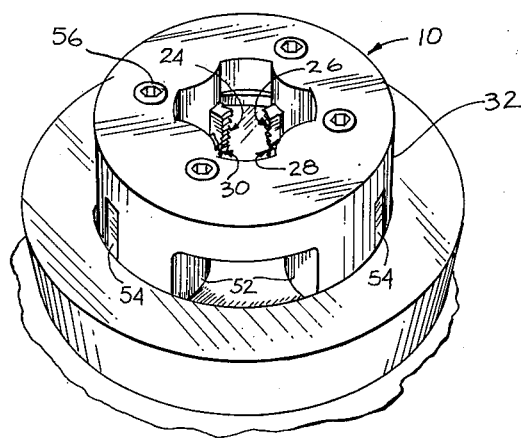

FIG. 3 is a view in horizontal cross section taken along the line 3—3 of FIG. 2; and FIG. 4 is a fragmentary view in perspective of the threading die head of FIGS. 2 and 3, but with the die head rotated 45°.

Figure 1:
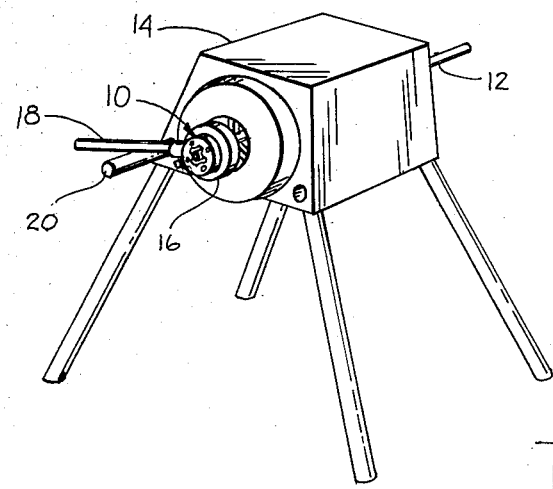
FIG. 1 is a view in perspective of a threading die head according to the invention in use with a pipe-rotating machine.

Referring to FIG. 1, a threading die head 10 according to the invention is shown in association with an end of a pipe 12 which is rotated by a conventional power drive machine 14, as is well known in the art. The die head 10 has a ratchet wrench 16 with a handle 18 extending therefrom which is prevented from rotating by a bar 20 extending outwardly from the power drive 14. This prevents the die 10 from rotating and thus provides relative rotation between the die head 10 and the pipe 12.

Referring in more detail to FIGS. 2–4, the die head 10 basically includes a body 22, chasers 24, 26, 28, and 30, and a chaser clamping ring 32. The body 22 has a plurality of ratchet teeth 36 (FIG. 3) around the periphery thereof for engaging a reversible pawl (not shown) carried by the ratchet wrench 16, as is well known in the art. Of course, the body 22 can also be rotated by means of a handle attached directly thereto. A pipe-guiding bore 38 extends centrally through the body 22 for guiding the end of the pipe 12 toward the chasers 24—30 when the die head 10 is placed over the end of the pipe. The bore 38 serves only as a guide and does not closely fit around the pipe so that the bore need not be formed with close tolerances. To this point, the die 10 is of conventional design according to principles which are well known in the art.

In accordance with the invention, a circular, planar surface 40 is machined on a face 42 of the die head body 22. The surface 40 can be turned on a lathe, thereby assuring that the surface will be planar and that all four of the chasers 24—30 are supported on a common plane. The teeth of the chasers are spaced from lower edges 44 at different distances so that the spacing of the teeth of adjacent chasers varies by a distance equal to one-fourth the pitch of the threads to be cut on a pipe. It will be readily understood that if the lower edges 44 of the chasers 24—30 are not in a common plane, the teeth will not be properly spaced even to the extent that some teeth will cut into threads being cut by teeth of a prior chaser. In previously known die heads, the chasers rested in grooves milled at 90° angles in extensions of the die body. Two diametrically opposed grooves were first milled and the body was then rotated 90° and the other two milled. It was not uncommon for the bottoms of the grooves not to lie in a common plane with this method of machining.

An annular shoulder 46 is also provided on the face 42 when the surface 40 is turned thereon. When the chasers 24—30 are placed on the surface 40, they are positioned with their back edges 48 against the shoulders 46 which thus positions the teeth of the chasers radially with respect to the pipe to be threaded. With this arrangement, there are only two dimensions which can affect the radial positions of the teeth. These are the diameter of the shoulder 46 and the length of the chasers 24—30. The radial positions of the teeth must be held within a tolerance of approximately ± 0.002" in order to cut teeth within industry standards. In normal practice, it is relatively easy to hold the diameter of the shoulder 46 within tolerances of ± 0.001" and to hold the lengths of the chasers to tolerances of ±0.0005" This will result in a maximum variation in the radial position of the teeth of ±0.0015" which will enable accurate threads to be cut.

A clamping ring 50 positions the chasers 24—30 90° apart and maintains them tightly against the surface 40. For the first purpose, the ring 50 has four generally semi-cylindrical posts 52 extending outwardly therefrom toward the surface 40 with grooves 54 disposed radially in each of the posts 52 into which the chasers 24—30 are placed. The diameter of the ring 50 and the distance between the outer surfaces of the diametrically opposed posts 52 is slightly less than the diameter of the circular planar surface 40 so that the ends of the posts 52 can be inserted within the shoulder 46. In addition, the lengths of the posts 52 as measured from the bottom of the grooves 54 to their ends is less than the width of the chasers 24—30 so that the ends of the posts 52 will not contact the surface 40.

A plurality of machine screws 56 extend through screw holes 58 and counterbored recesses 60 into tapped holes 62 in the die body 22. When the screws 56 are tightened, the chasers 24—30 are clamped between the ring 50 and the surface 44 and are held tightly thereby.

The chasers 24—30 are provided with notches 64 which are aligned with projections 66 in the bottoms of the grooves 54, but are larger than the projections and are used only to prevent the chasers 24—30 from falling out accidentally if the screws 56 are loose. Should the chasers 24—30 be positioned on the surface 40 when the ring 50 is put in place and the screws 56 are tightened so that the chaser ends 48 do not contact the annular shoulder 46, the force exerted on the chasers as they begin to cut threads on a pipe will force them outwardly against this shoulder.

It may be noted that the only portions of the ring 50 and the posts 52 which require machining are the screw holes 58 and the counter bored recesses 60. For the body 22, the only parts which must be machined are the surface 40 and the tapped holes 62.

Various modifications of the above-described embodiment of the invention will be apparent to those skilled in the art and can be incorporated into a threader without departing from the scope of the invention if within the spirit and tenor of the appended claims.

I claim:

1. In a pipe threading die head, a body having a pipe-guiding bore extending therethrough, said body having a circular, planar surface around said bore and a structurally integral annular shoulder at an outer edge of said surface, a plurality of chasers, a clamping ring, a plurality of posts extending outwardly from said ring, there being one post for each chaser, each of said posts having a groove extending radially of said clamping ring, the distance from the outer surface of each of said posts to the center of said ring being less than the radius of said annular shoulder, and the depth of said grooves being less than the width of said chasers whereby said posts will be substantially out of contact with said shoulder and said planar surface when assembled with said body, said chasers being located in said grooves to place them in predetermined positions circumferentially with respect to said bore, with their teeth extending radially inwardly, said shoulder abutting outer ends of said chasers to hold them in predetermined positions against radially outward movement when a pipe is being threaded, and means associated with said ring for urging said ring toward said planar surface to hold said chasers tightly against said surface.

2. A die head according to claim 1 and nesting means associated with said grooves and said chasers for preventing radial movement of said chasers when said fastening means are loose.

3. In a pipe threading die head, a body having a pipe-guiding bore extending therethrough, said body having a circular planar surface around said bore and a structurally integral annular shoulder on said surface concentric with said bore, means on said body for turning said body around an axis of said bore, a plurality of chasers of rectangular cross section with teeth on one end thereof, a clamping ring, a plurality of posts extending outwardly from said ring, there being one post for each chaser, each of said posts having a groove extending radially of said clamping ring, one of said chasers being located in each of said grooves to place said chasers in predetermined positions circumferentially of said ring with their teeth extending inwardly, the width of said chasers being greater than the depth of said grooves, and a plurality of separate, spaced fastener means associated with said ring for urging said ring toward said planar surface to clamp said chasers tightly between said surface and bottoms of said grooves with the ends of said posts being substantially out of contact with said planar surface, the outer ends of said chasers abutting said shoulder to limit radially outward movement of said chasers and to hold them in predetermined positions.

References Cited in the file of this patent
UNITED STATES PATENTS

| | | |
|---|---|---|
| 719,089 | Conant | Jan. 27, 1903 |
| 2,014,312 | Dagg | Sept. 10, 1935 |
| 2,600,776 | Ingwer | June 17, 1952 |

FOREIGN PATENTS

| | | |
|---|---|---|
| 409,276 | Italy | Feb. 9, 1945 |